United States Patent [19]

Lo et al.

[11] Patent Number: 5,387,863
[45] Date of Patent: Feb. 7, 1995

[54] SYNTHETIC APERTURE ARRAY DIPOLE MOMENT DETECTOR AND LOCALIZER

[75] Inventors: Allen K. Lo, Diamond Bar; Wilbur W. Eaton, Jr., Placentia, both of Calif.; Ben R. Breed, Austin, Tex.

[73] Assignee: Hughes Aircraft Company, Los Angeles, Calif.

[21] Appl. No.: 872,764

[22] Filed: Apr. 14, 1992

[51] Int. Cl.[6] .................. G01B 7/00; G01C 21/00
[52] U.S. Cl. .................. 324/207.13; 324/207.22; 324/244; 324/256; 364/449; 364/556; 364/561
[58] Field of Search .................. 324/207.14, 207.26, 324/245, 246, 256, 207.13, 207.22, 207.23, 244, 260; 342/459; 364/449, 559, 556, 561

[56] References Cited

U.S. PATENT DOCUMENTS

| | | | |
|---|---|---|---|
| 4,086,590 | 4/1978 | Goggins | 324/207.26 |
| 4,710,708 | 12/1987 | Rorden et al. | 324/207 |
| 5,029,144 | 7/1991 | Griffin | 367/11 |
| 5,134,369 | 7/1992 | Lo et al. | 324/245 |
| 5,239,474 | 8/1993 | Eaton et al. | 364/449 |

FOREIGN PATENT DOCUMENTS

789949 12/1980 U.S.S.R. .

*Primary Examiner*—Nelson Moskowitz
*Attorney, Agent, or Firm*—W. K. Denson-Low

[57] ABSTRACT

A synthetic array comprising a moving magnetic sensor that provides a signal representative of an array of magnetic sensors is coupled to a digital signal processor is used to break a magnetic dipole field into its components, and a magnetic signature of the present magnetic field is created. Predicted dipole signatures are precomputed for multiple magnetic orientations of the dipole at each of a plurality of range locations, expressed in terms of Anderson functions, which are a set of equations that decompose the magnetic field in each of the magnetic response locations, and are stored in a lookup table for reference. Input data measured by the moving synthetic array are processed and each magnetic value is predicted to process against background noise. A long term time average consistent with the relative motion of the dipole is computed using bandpass filtering of the signals from the synthetic array. The bandpass filtered data is used to update the predicted data so that anomalies and other non-dipole data is removed from the signals that are processed. The data are then expressed in terms of Anderson functions. The data are matched faltered, wherein it is correlated with the stored precomputed predicted dipole signatures. The correlation yields a set of values that is then thresholded. If a dipole is present at any of the locations, then the correlated normalized value computed as stated above will be higher than the chosen threshold. The dipole locations that are above the threshold are then displayed on a monitor showing the relative location and dipole orientation.

5 Claims, 4 Drawing Sheets

SYNTHETIC APERTURE ARRAY DIPOLE MOMENT DETECTOR AND LOCALIZER

BACKGROUND

The present invention relates generally to systems and methods that provide for dipole moment detection and localization, and more particularly, to systems and methods that provide for dipole moment detection and localization using synthetic aperture array.

Conventional magnetic anomaly detection systems employ proximity detection of a magnetic dipole. Typical of this type of system is the well known airborne magnetic anomaly detection system that is towed by a P3 aircraft, for example. In this system, detection is performed using a single sensor to detect a change in the total local magnetic field. The disadvantage of this approach is the limited amount data generated by the system, in that it provides for no dipole direction, no dipole orientation, gross localization and the system has relatively low processing gain.

To overcome the limitations of such conventional magnetic anomaly detection systems, an improved dipole moment detector and localizer system assigned to the assignee of the present invention is disclosed in U.S. patent application Ser. No. 07/616,158, filed Nov. 20, 1990 now U.S. Pat. No. 5,239,474. In this dipole moment detector and localizer system, the detection and localization is accomplished using the outputs from a fixed vector-magnetometer array. The dipole moment detector and localizer described in this patent application has yielded dramatic performance improvement over the current magnetic anomally detection (MAD) systems that use a single sensor to detect a change in the total local magnetic field derived from a dipole.

Thus, it would be an improvement in the art to have a system and method that provides dipole detection and the localization and orientation of the dipole.

SUMMARY OF THE INVENTION

In order to provide the above improvement, the present invention provides for a dipole detection and localization system and method that combines the dipole moment detector and localizer system disclosed in the above-identified patent application with a synthetic aperture array disposed on a moving platform or aircraft to achieve improved performance. Using the dipole moment detector and localizer system disclosed in the above-identified patent application to process the output of the moving sensor that synthesizes an array of sensors not only provides for dipole detection, but also provides for localization and orientation of the dipole.

In the present invention, the processing algorithm of the dipole moment detector and localizer system processes the output of a synthetic aperture array generated by the forward motion of a single magnetometer (or multiple magnetometers) located on a moving platform instead of the sensor outputs from a fixed array of magnetometers. In the present synthetic aperture array dipole moment detector and localizer system and method, the array output is synthesized by the movement of a magnetic sensor or a small number of sensor through space. In a manner similar to the dipole moment detector and localizer disclosed in the above-identified patent application, one embodiment of the synthetic aperture array dipole moment detector and localizer system and method of the present invention is used to detect and localize surface and subsurface ocean going vessels for airborne ASW applications. The present synthetic aperture array dipole moment detector and localizer system and method, provide for accurate localization of a dipole, in addition to the basic detection function, a capability that is currently lacking in present magnetic anomaly detection (MAD) systems.

The present dipole moment detector and localizer uses the synthetic aperture array and digital signal processing to break a magnetic field into x, y, and z components or into its total field component at each of a plurality of positions relative to the synthetic aperture array. In doing this, a magnetic signature of the magnetic field of a magnetic dipole located in the field is created. This magnetic signature provides an easily recognizable feature for an automatic pattern recognizing system.

The present invention precomputes predicted dipole signatures for multiple magnetic orientations of the dipole at each of a plurality of range locations. Thus, a plurality of predicted signatures are computed and stored in a lookup table for reference. Input data measured by the synthetic aperture array are processed against the background ambient noise using a linear model. Also a long term time average consistent with the relative motion of a dipole is computed. This amounts to bandpass filtering or long term averaging of the signals from the synthetic aperture array. The bandpass filtered data is used to update the predicted data so that anomalies and other non-diphole data is removed from the signals that are processed. The data is then expressed in terms of Anderson functions, which are a set of mathematical functions that decompose the magnetic field into its components in each of the magnetic response locations.

Then the data expressed in terms of the Anderson functions is matched filtered, wherein it is mathematically correlated by means of a dot product with the stored precomputed predicted dipole signatures. The dot product, or correlation, of these two sets of data yields a set of values including the largest value in the set of correlated data and is then normalized. This normalized data is then thresholded, and if a dipole is present at any one of the locations, then the correlated, dot product, normalized value computed as stated above will be higher than the chosen threshold.

The dipole locations that are above the threshold are then displayed on a monitor allowing the relative location and dipole orientation. This display of the data is typically updated at frequent intervals. In this way, anomalies and other non-dipole data that are detected only appear at one display interval and then disappear during the next display interval. Since most ocean going vessels are magnetic dipoles, the dipole moment detector and localizer may be used to detect and localize surface and sub-surface ocean going vessels. The dipole moment detector and localizer provides for a new approach to shallow water dipole detection. Other applications for the dipole moment detector and localizer include battlefield management, geological survey, and harbor protection, and ground traffic management.

The advantages of the synthetic array dipole moment detector and localizer system and method of the present invention are that they provide detection, localization and dipole orientation with a greater system signal processing gain over existing systems, because it uses the synthetic aperture array. The processing performed by the present invention allows dipole of interest tracking to be performed more accurately and at greater ranges than with the proximity detection employed in conventional systems, such as the P3 airborne magnetic anomaly detection system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
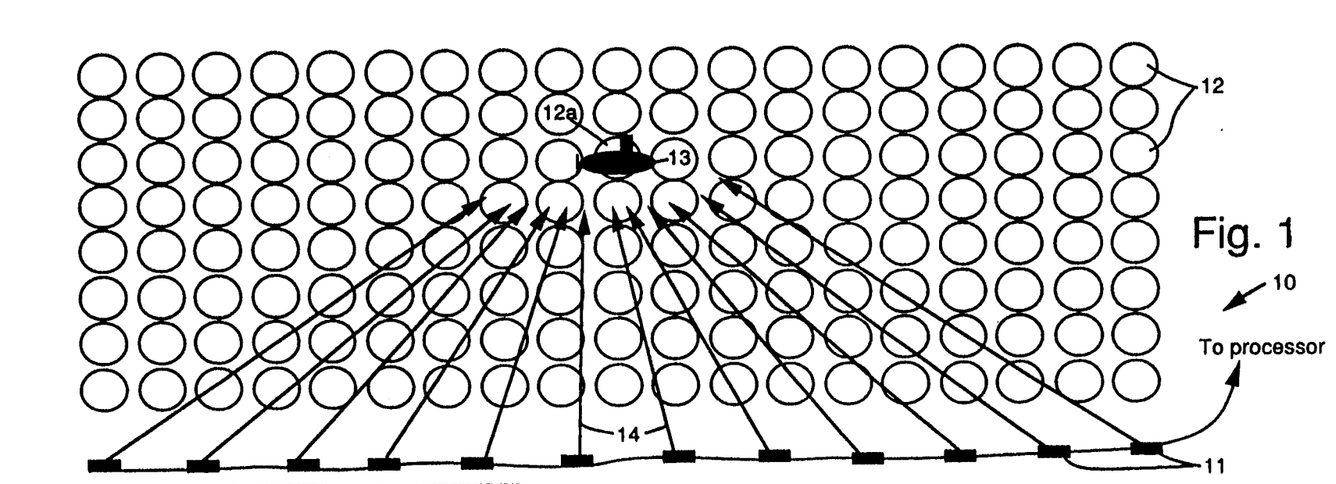
FIG. 1 shows a prior dipole moment detector and localizer system, a portion of which forms part of the present invention.

Referring to the drawing figures, FIG. 1 shows a prior dipole moment detector and localizer system 10, a portion of which forms part of the present invention, as will be described below. This system 10 is described in U.S. patent application Ser. No. 07/616,158, filed Nov. 20, 1990, now U.S. Pat. No. 5,239,474 the contents of which are incorporated herein by reference. FIG. 1 depicts the system processing diagram of a fixed line array dipole moment detector and locator. This system 10 employs a fixed line array of magnetic sensors 11 to detect and localize a moving dipole 12. A complete understanding of the design and operation of this system 10 may be had from a reading of the above-identified patent application. As was mentioned above, a small disadvantage of this approach is the limited information generated by the system 10. This system 10 provides no dipole orientation information and only provides for gross localization of the location of the dipole 12.

Figure 2:
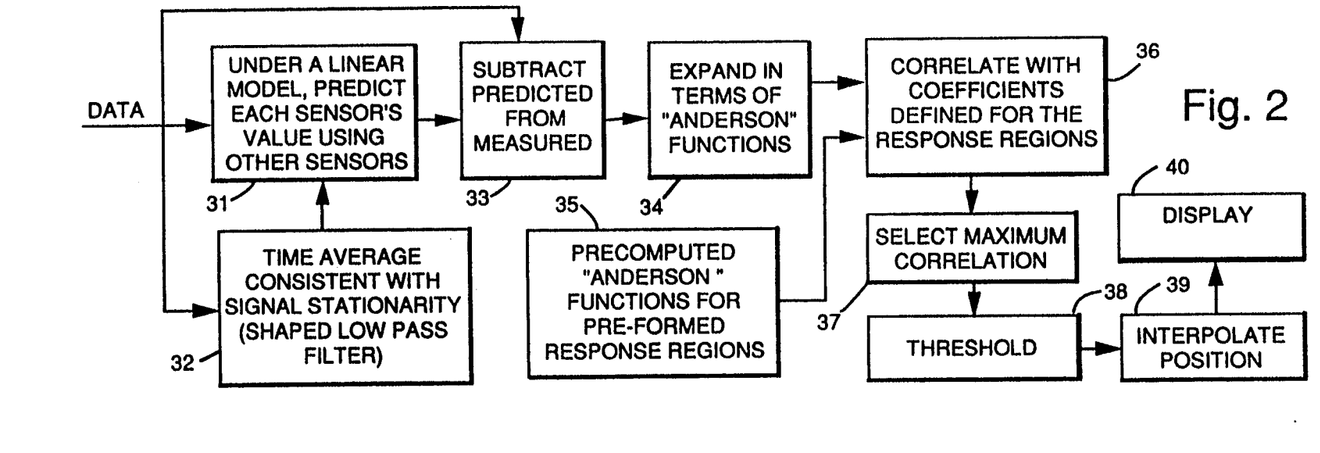
FIG. 2 shows a block diagram illustrating the processing steps utilized in the system of FIG. 1.

More particularly, FIG. 1 shows a detection and location system 10 that includes an array of magnetic sensors 11 that is coupled to processing apparatus (shown in FIG. 2). The array of circular locations represent magnetic response locations 12 that are defined relative to the array of magnetic sensors 11. The magnetic response locations 12 have precomputed magnetic responses associated therewith which represent the magnetic field that would result if a magnetic dipole were present within each particular magnetic response location 12 at a plurality of different orientations. Also shown in FIG. 1 is a particular magnetic response location 12a (highlighted) in which is located a magnetic dipole 13, represented by the submarine. Also a plurality of arrows representing magnetic vectors 14 are shown extending from each sensor of the array of magnetic sensors 11 toward the particular magnetic response location 12a in which the magnetic dipole 13 is located. Each sensors reading contributes a set of vectors indicative of the location of the magnetic dipole 13, thereby forming a sensed signature that is processed using the concepts of the present invention as described below.

Referring to FIG. 2, it shows a block diagram of processing apparatus 20 and the processing steps implemented therein utilized in the system 10 of FIG. 1. In particular, FIG. 2 shows the processing steps performed within the processing apparatus 20 of the present invention. As shown in FIG. 2, in a first processing step 31, data from the array of sensors 11 is processed using a linear model to predict each sensor's value using the other sensors. In addition, in a second processing step 32, the data is time averaged to performs long term integration thereof which operates as a low pass filter on the data. This data is used to adjust the values of the data computed in the first processing step 31. Furthermore, in a third processing step 33, the predicted data, as modified by the time averaged data, is subtracted from the measured data and the resultant data is expanded in terms of Anderson's functions in step 34. Prior to operational use of the present invention, and as is indicated in process step 35, stored data is generated in terms of the Anderson functions which comprise magnetic responses associated with each of the magnetic response locations 12 that represent the magnetic field that would result if a magnetic dipole were present within each particular magnetic response location 12.

The precomputed data generated in step 35 is then correlated with the resultant data generated in step 34 in processing step 36. This correlation comprises a dot product of the two sets of data, and the correlation produces sharply increased dot product values when the two data values are substantially the same, while producing relatively low values when the data is only moderately different. A maximum, or peak, correlated value is selected in processing step 37. A threshold is selected in step 37, say for example, 50% of the peak correlated value, and correlated and normalized signals above the threshold are displayed by interpolating the relative positions (locations) of the magnetic response location and displaying them on a monitor, for example, as is illustrated in steps 39 and 40.

Figure 3:
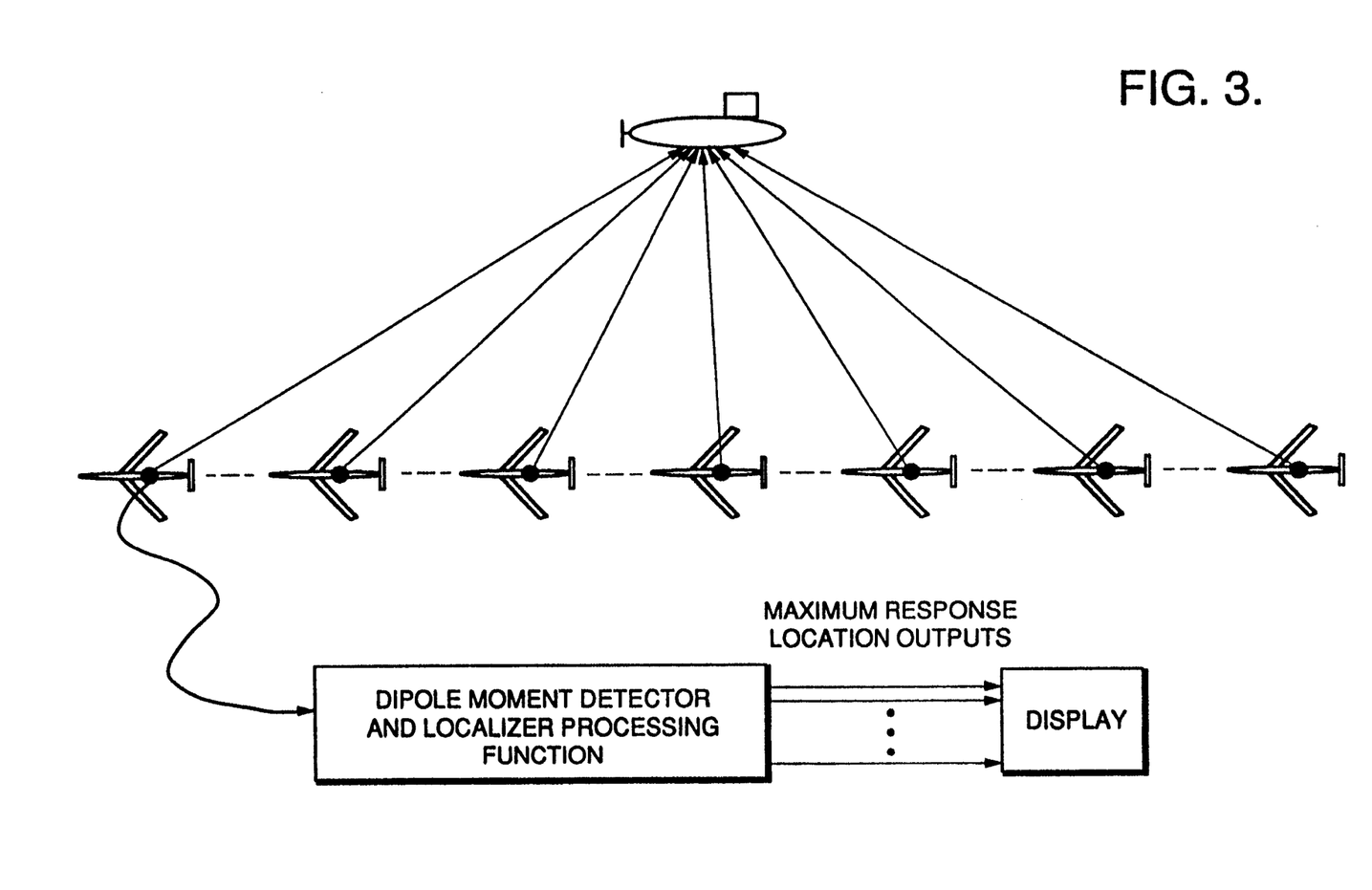
FIG. 3 shows a synthetic aperture array dipole moment detector and localizer system in accordance with the principles of the present invention.

FIG. 3 shows a synthetic aperture array dipole moment detector and localizer system 50 in accordance with the principles of the present invention. This system 50 is comprised of a moving platform 51, such as an aircraft 51, for example, in which is disposed a synthetic aperture array 52. The synthetic aperture array 52 is coupled to processing apparatus 20 shown in FIG. 2. The synthetic aperture array 52 is comprised of a single magnetometer, for example, or an array of magnetometers which are moved by the aircraft 11 relative to the dipole. This motion generates a large amount of data that is used to synthesize an array of sensors. This will be described in more detail below.

The array of circular locations represent the magnetic response locations 12 that are defined relative to a magnetic sensor 53, or magnetometer 53, located on the aircraft 51 that houses the synthetic aperture array system 50. The magnetic response locations 12 have precomputed magnetic responses associated therewith which represent the magnetic field that would result if a magnetic dipole were present within each particular magnetic response location 12 at a plurality of different orientations. Also shown in FIG. 3 is a particular magnetic response location 12a (highlighted) in which is located a magnetic dipole 13, represented by the submarine. Also a plurality of arrows representing magnetic vectors 14 are shown extending from the sensor 53 on the aircraft 51 toward the particular magnetic response location 12a in which the magnetic dipole 13 is located.

The sensor reading taken at a plurality of locations along a particular flight path of the aircraft 51 contributes a set of vectors indicative of the location of the magnetic dipole 13, thereby forming a sensed signature that is processed using the concepts of the present invention as described below.

Figure 4:
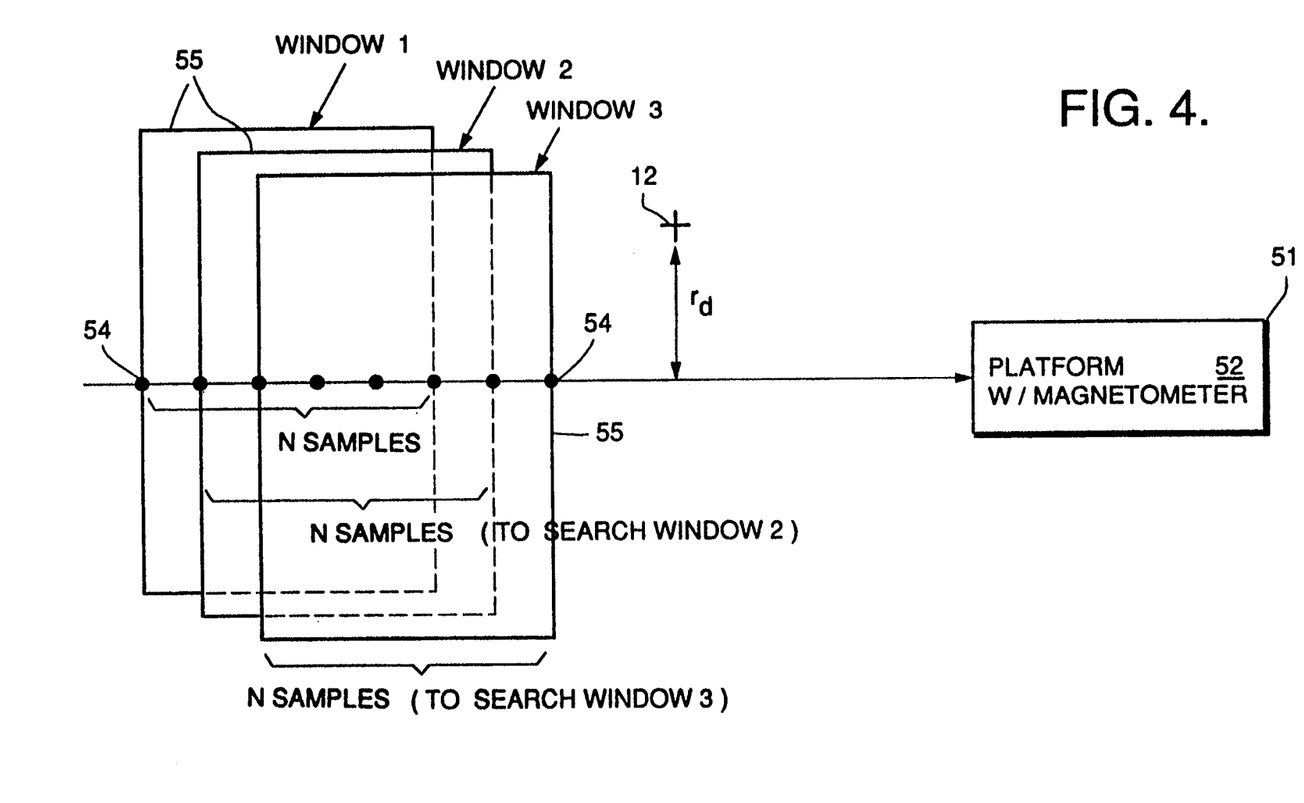
FIG. 4 shows the windowing process used in the system of FIG. 3 to synthesize a sensor array.

The synthetic aperture processing utilized in the system 50 of the present invention will be described with reference to FIGS. 3 and 4. FIG. 3 shows the moving platform 51 having the magnetometer 53 disposed thereon that is moving to the left in the drawing figure. FIG. 4 shows the windowing process used in the system of FIG. 3 to synthesize a sensor array; and Referring to FIG. 4, there are a plurality of data samples 54 shown as dots along the direction of travel of the platform 51 (shown moving to the right in FIG. 4). A plurality of windows 55 are shown that each encompass a subset of N samples from the total number of samples taken by the synthetic aperture radar 52. Each subsequent widow 55 is offset from the preceding window 55 by one data sample 54.

The synthetic aperture is formed by sampling the vector (or resonance) magnetometer 53 on the airborne platform 51. Once a predetermined number (N) samples 54 are collected, matched field processing is performed generally in accordance with the fixed array embodiment disclosed in the above-referenced patent application and FIGS. 1 and 2. Initially, N samples 54 are collected prior to processing the grid of interest in window 1. Thereafter, one or more new samples 54 are added (with the same number of samples 54 being dropped off at the front end) to process a new window. At any given time after processing begins, the N samples 54 used for processing are represented by the equation $$x = H + N = s^T h \frac{M}{r_d^3} + \text{noise}$$

where s is the dipole matrix, h is the Anderson matrix, and 3×N is used for a vector magnetometer 53 and 1×N is used for a resonance magnetometer 53.

Figure 5:
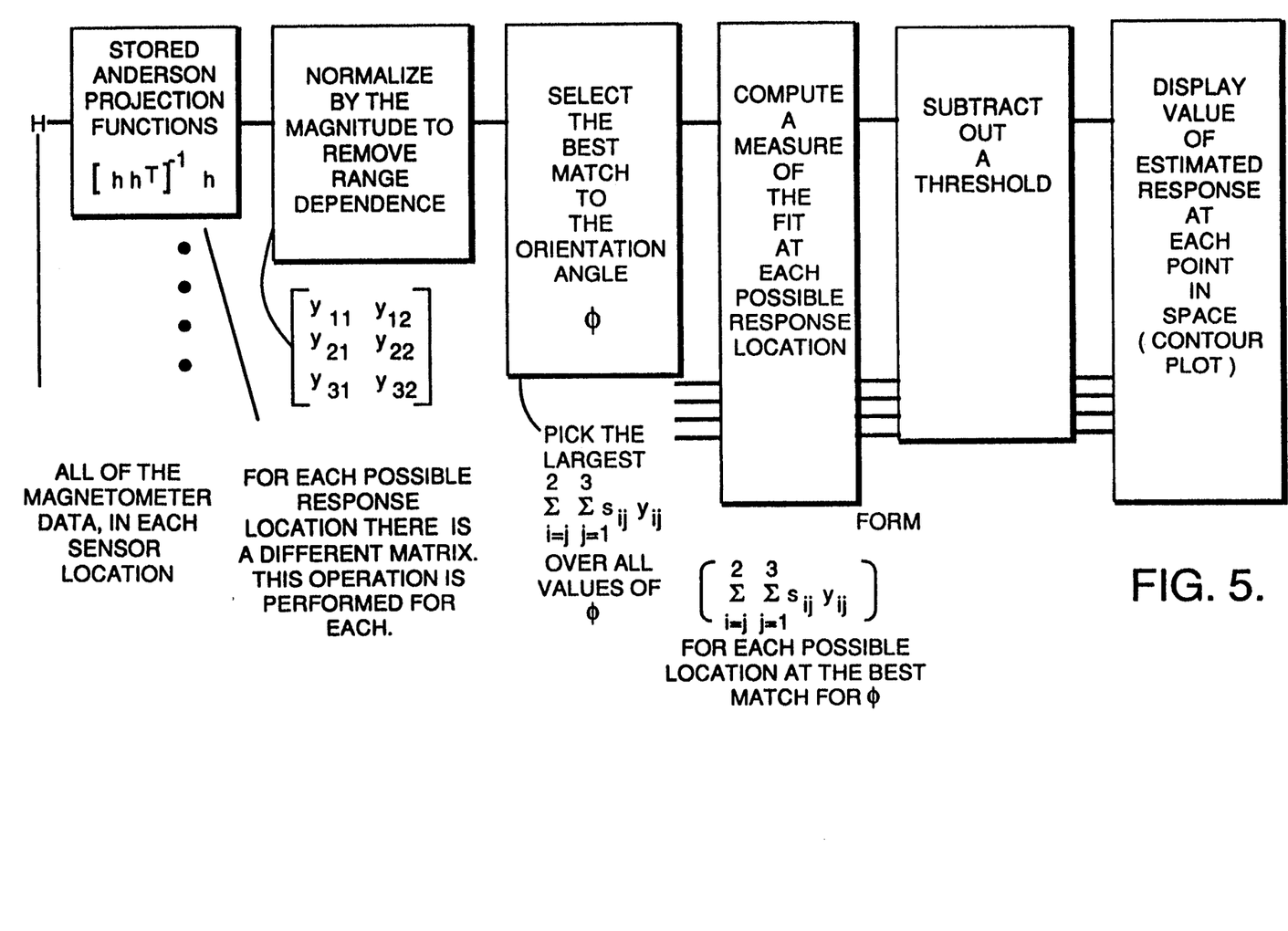
FIG. 5 shows the details of the processing performed in the system of FIG. 3.

A detailed discussion of the processing performed in the present system 50 will be discussed with reference to FIG. 5. FIG. 5 shows the details of the dipole moment detection and localization processing performed in the synthetic array dipole moment detector and localizer system 50. The data samples 54 from the magnetometer 51 are stored in a memory and the Anderson functions are also stored, one for each possible response location.

Synthetic array spatial matching is achieved as follows. The two vector functions to which the product is applied comprise the calculated and measured magnetic field vectors along the array. When the calculated field matches well with the measured field, a large value is expected for the inner product. The Anderson functions are defined with respect to a given position $(x_1, y_1, z_1)$. Each of the set of these positions is called a maximum response location. Thus each maximum response location has its own associated Anderson function, and for a given orientation, has its own correlation with the measurements. The maximum value for the inner products on the maximum response location s determine where the dipole 12 is located (which maximum response location) and with what orientation.

Discrete implementation of the dipole moment detection and localization processor 20 is achieved as follows. The dipole moment detection and localization processor 20 has been implemented in the continuous domain. It is necessary however to mechanize this processor 20 in the discrete domain since in the actual system implementation, only spatially sampled measurements of a dipole 12, i.e. outputs from a synthesized array of sensors, are available for processing. To model the discrete implementation of the dipole moment detection and localization processor 20, a line of N magnetic sensors is disposed along an x-axis with each sensor located at $X_n$. Let h (3×n) be the Anderson function matrix having the lth row and nth column element defined as follows:

$$h_{ln} = \sin^l(\theta_n)\cos^{5-l}(\theta_n) \qquad \text{Eq. (1)}$$

where l=0, 1, 3 and n=1, 2, ..., N, are indices of the order of the Anderson functions and the sensor number along the synthesized array, respectively. In this expression, $\theta_n$, the angle of the nth sensor relative to the dipole 12 located at $(x_1, y_1)$, is the arctangent of the directional unit vector from the sensor to the dipole 12, i.e., $$\theta_n = \tan^{-1}\left(\frac{x_n - x_1}{y_1}\right) \qquad \text{Eq. (2)}$$

Define a dipole orientation matrix, $s(\phi_1)$, as follows:

$$s(\phi_1) = \frac{M}{y_1^3}\begin{bmatrix} -\overline{m}_1 \cdot \overline{\alpha} & 2\overline{m}_1 \cdot \overline{\beta} \\ 3\overline{m}_1 \cdot \overline{\beta} & 3\overline{m}_1 \cdot \overline{\alpha} \\ 2\overline{m}_1 \cdot \overline{\alpha} & -\overline{m}_1 \cdot \overline{\beta} \end{bmatrix} = \frac{M}{y_1^3}\begin{bmatrix} -\cos\phi_1 & 2\sin\phi_1 \\ 3\sin\phi_1 & 3\cos\phi_1 \\ 2\cos\phi_1 & -\sin\phi_1 \end{bmatrix} \qquad \text{Eq. (3)}$$

By pre-multiplying the Anderson functions matrix by the transpose of the dipole orientation matrix, $s(\phi_1)$, a matrix H is produced defined in Eq. (4) below, which is the output of the array of sensors in response to a dipole 12 located at $(x_1, y_1)$ with the orientation angle $\phi$ relative to the x-axis.

$$s^T(\phi_1) \cdot h \equiv [H_x - H_y]^T = \qquad \text{Eq. (4)}$$

$$\left\{ \begin{bmatrix} -\cos\phi_1 \\ 2\sin ?\ \phi_1 \end{bmatrix} \cdot h_0 + \begin{bmatrix} 3\sin\phi_1 \\ 3\cos\phi_1 \end{bmatrix} \cdot h_1 + \begin{bmatrix} 2\cos\phi_1 \\ -\sin ?\ \phi_1 \end{bmatrix} \cdot h_2 \right\}$$

where $h_0$, $h_1$ and $h_2$ are vectors of values representing the discrete Anderson functions evaluated at the sensors' locations relative to the dipole 12 in according to Eq. (2.17) above.

$$h = \begin{bmatrix} h_0 \\ h_1 \\ h_2 \end{bmatrix} = \begin{bmatrix} \cos^5\phi_1 & \cos^5\phi_2 & \ldots & \cos^5\phi_N \\ \sin\phi_1\cos^4\phi_1 & \sin\phi_2\cos^4\phi_2 & \cdots & \sin\phi_N\cos^4\phi_N \\ \sin^2\phi_1\cos^3\phi_1 & \sin^2\phi_2\cos^3\phi_2 & \cdots & \sin^2\phi_N\cos^3\phi_N \end{bmatrix} \qquad \text{Eq. (5)}$$

Eq. (4) describes the field of a dipole 12 in terms of a weighted sum of the Anderson functions where the weights are dependent on the position and orientation of the dipole 12. Since the Anderson functions are not orthonormal, the expansion of an arbitrary function requires the use of three adjoint Anderson functions which are defined as follows:

$$\hat{h} = \begin{bmatrix} \hat{h}_0 \\ \hat{h}_1 \\ \hat{h}_2 \end{bmatrix} = [hh^T]^{-1} h \quad \text{Eq. (6)}$$

Now, for an arbitrary function $f = [f_1 f_2 \ldots f_N]^T$ representing the outputs of an array of sensors, the expansion of this function in terms of a given set of Anderson functions is obtained as shown in Eq. (7)

$$a_i = \hat{h}_i^T \cdot f = \sum_{n=1}^{N} h_{in} f_n; \quad i = 0,1,2 \quad \text{Eq. (7)}$$

If $H_s$ is the output of the array in response to a dipole 12 located at $(x_s = x_1, y_s = y_1)$ with an orientation $\phi_s = \phi_1$, and it is expanded in terms of the Anderson functions defined in Eq. (5), the resulting Anderson weights are the elements of the dipole orientation matrix shown in Eq. (3) and are given in Eq. (8) below.

$$a = [a_x \, a_y] = \begin{bmatrix} a_{x1} & a_{y1} \\ a_{x2} & a_{y2} \\ a_{x3} & a_{y3} \end{bmatrix} = \quad \text{Eq. (8)}$$

$$\hat{h}H^T = [hH^T]^{-1} h H_s^T = [hh^T]^{-1} h(h^T s(\phi_s)) = s(\phi_1)$$

The primary conceptual difference between the system 50 of the present invention and the prior fixed sensor array system 10 can be better understood by comparing the systems 10, 50 shown in FIGS. 1 and 3. Specifically, the primary conceptual difference lies in the manner by which the magnetic field is measured and converted to input data for subsequent processing. In the fixed line array system 10 of FIG. 1, measurements are taken continuously by all sensors 11 in the array, with each sensor 11 having a slightly different perspective of the dipole moment, which when processed together by the processing procedure determines the location of the dipole 12. On the other hand, in the synthetic aperture array system 50 of the present invention, the sensor 53 is moved physically in the aircraft 51 to synthesize an array of sensors in order to duplicate the required different aspect measurements of a dipole 12. The required different aspect measurements are not simultaneously accomplished in the present system 50. Since it is anticipated the dipole 12 will not change position or orientation significantly within the time frame during which the synthetic aperture array is generated, asynchronous measurements will not cause significant change in the performance of the system 50 of the present invention. Aside from this major difference in the manner of obtaining and inputting measured data, the processing procedure for detecting and determining the locations of dipoles 12 in the synthetic aperture array system 50 is substantially identical to the procedure in the fixed array system 10, and is shown and described with reference to FIG. 2 above.

The processing performed using the method and apparatus of the present invention will now be discussed in more detail and utilizing alternative terminology. Specifically, the data is temporally filtered. This is accomplished by the low pass filtering discussed with reference to FIG. 2. Spatially coherent fluctuations are removed. This is also accomplished by the low pass filtering discussed with reference to FIG. 2. Then spatial matched filtering is employed to determine the existence of magnetic dipoles in the detection region of the array of sensors 12. This is accomplished by the correlation step 36 discussed with reference to FIG. 2. Next the matched filtered data is processed using a square law detection scheme, and then this data is smoothed. The smoothed data is then thresholded and magnetic dipoles located in the data are localized. This corresponds to the threshold and interpolation steps 38, 39 discussed with reference to FIG. 2. Finally, the position of the detected magnetic dipoles are displayed for viewing by the user of the system 30.

The following is a description that illustrates the generality of the synthetic array magnetic detection and localization system 50 of the present invention. The method and the example describing the magnetic detection and localization technique of the present invention are based on a particular application of the principles disclosed; namely it has used a particular method of generating the response function, known as and described as the correlation. For the correlation, it uses a particular formulation of an inner product, in which the measured and the computed magnetic responses are each expanded in terms of Anderson functions.

The basic method used in generating the responses at the various chosen locations relative to the system 50 is the following. Form an estimate of the magnetic field on the moving sensor 53 (magnetometer), if there were a magnetic dipole located at each of the selected locations (these estimates are the calculated values for the array magnetic fields). Take measurements of the magnetic field at each location of the sensor 53 at the time desired to detect and localize a magnetic dipole within the field.

This amounts to collecting and storing data samples over time using a magnetometer 53 located on a moving platform 51. The array of sensors is synthesized from the collected data. Remove as much of the spatial and temporal variations caused by the naturally occurring background as is possible using the temporal and spatial smoothing techniques disclosed herein.

Correlate the measured values with each of the calculated values for the synthesized array of sensors, whereby the term correlate we mean the multiplication of the calculated array of values with the array of measurements and summing the results over the synthesized array of sensors (the values of these correlations for each selected location off of the synthesized array of sensors, expressed as a function of the actual dipole location is what is called the response function J for that selected location). If one of the correlations resulting has a significantly larger value than the others and if it is greater than some predetermined threshold, a detection is declared for the location off of the synthesized array corresponding to the calculated values which resulted in the larger value of the correlation.

In the system 50, temporal gain results from matching the signal and noise bandwidths. Spatial coherence gain removes fluctuations common to the sensors. Spatial matching gain arises from matching the spatial filter to the field of the dipole 12 using the Anderson functions. Post detection gain (track before detect gain) allows the use of a lower recognition differential (false alarms are controlled by requiring a viable or realistic track).

Thus there has been described a new and improved system and method that provide for dipole moment detection and localization using synthetic aperture array. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method of detecting and locating a magnetic dipole comprising the steps of:

sensing the magnetic field produced by the dipole using a moving magnetic sensor that is moved relative to the location of a magnetic dipole to synthesize a plurality of output signals that are representative of a plurality of spatially distributed magnetic sensors and that are indicative of the magnetic field sensed by the moving magnetic sensor;

generating a magnetic signature produced by the magnetic field and the dipole which represents a magnetic response function of the dipole by processing the output signals from the moving magnetic sensor to decompose the magnetic field into its magnetic field components; and processing the magnetic response function to produce magnetic signature features therefrom that are indicative of the location and relative orientation of the magnetic dipole and means for displaying the location of the dipole.

2. A method of detecting and locating a magnetic dipole comprising the steps of:

forming a normalized estimate of the magnetic field to be sensed by a moving magnetic sensor that is moved relative to the location of a magnetic dipole using known magnetic dipole orientations located at each of a plurality of preselected locations to provide an array of estimated signals;

processing the estimated signals to produce a first set of Anderson function expansion coefficients representative of each of the estimate signals, and storing the Anderson functions;

measuring the magnetic field using the moving magnetic sensor that is moved relative to the location of the magnetic dipole that is to be detected to produce measured magnetic field signals;

removing spatial and temporal variations in the magnetic field measured. by the sensor by temporally and spatially smoothing the measured magnetic field signals;

processing the temporally and spatially smoothed measured magnetic field signals to produce a second set of Anderson function expansion coefficients representative of each of the measured magnetic field signals;

correlating the first and second sets of Anderson function expansion coefficients to produce a response function for the magnetic dipole location; and identifying the location of the dipole if one of the correlations has a significantly larger value than the others, and if it is greater than a predetermined threshold, and the location of the dipole corresponds to the location represented by the measured magnetic field signals that produced in the significantly larger value, and providing a visual display of said location.

3. A method of detecting and locating a magnetic dipole comprising the steps of:

precomputing a plurality of magnetic field signatures that are representative of a magnetic field using a moving magnetic sensor that is moved relative to the location of a magnetic dipole that-provides signals representative of an array of sensors, assuming that there is a magnetic dipole located at each of a plurality of selected locations relative to the moving sensor, to provide for calculated estimate values;

storing the calculated estimate values;

taking measurements of the magnetic field at each of a plurality of locations in the presence of a magnetic dipole within the field by moving the sensor relative to the magnetic dipole and synthesizing signals that would be provided by the array of sensors;

removing the spatial and temporal variations present in the measured magnetic field caused by the naturally occurring background using temporal and spatial smoothing techniques;

correlating the measured values with each of the calculated estimate values for the synthesized array of sensors, by multiplying the calculated estimate values with the measured values and summing the results over the synthesized array of sensors; and if one of the resulting correlations has a significantly larger value than the others and if it is greater than a predetermined threshold, declaring a detection for the location corresponding to the calculated values which resulted in the larger correlation value, and providing a visual display of said location.

4. Apparatus for detecting and locating a magnetic dipole comprising:

a moving magnetic sensor for sensing the magnetic dipole to provide a synthesized signal representative of an array of spatially distributed magnetic sensors that each provide output signals that are indicative of the magnetic field sensed thereby;

processing means for generating a magnetic signature of the magnetic field produced by the magnetic dipole which represents a magnetic response function of the dipole by processing the synthesized output signals from the magnetic sensor to decompose the magnetic field into its magnetic field components; and processing means for processing the magnetic response function to produce predetermined features therefrom that are indicative of the location and relative orientation of the magnetic dipole display means for displaying the location of the identified dipole.

5. Apparatus for detecting and locating a magnetic dipole comprising:

a synthetic array comprising a moving magnetic sensor that provides an output signal representative of an array of magnetic sensors;

processing means coupled to the synthetic array, for storing an estimate of the magnetic field signature to be detected by the moving sensor using a known set of magnetic dipole orientations at each of a plurality of preselected locations to provide an array of estimate signals that are represented by a first set of Anderson functions, and for processing magnetic field signals indicative of the magnetic field measured by the synthetic array in the presence of the magnetic dipole that is to be detected, and for removing spatial and temporal variations in the magnetic field measured by the synthetic array by temporally and spatially smoothing the measured magnetic field signals, and for processing the temporally and spatially smoothed magnetic field signals to produce a second set of Anderson functions representative of each of the magnetic field signals, and for correlating the first and second sets of Anderson functions and for summing the results over the array of sensors to produce a response function for the magnetic dipole location, and for identifying the location of the dipole if one of the correlations has a significantly larger value than the others, and if it is greater than a predetermined threshold, and the location of the dipole corresponds to the location represented by the measured magnetic field signals that produced in the significantly larger value; and display means for displaying the location of the identified dipole.

* * * * *